(12) United States Patent
Abramov et al.

(10) Patent No.: US 6,570,665 B1
(45) Date of Patent: May 27, 2003

(54) METHOD FOR PRINTING MULTI-PAGE IMAGES

(75) Inventors: Ron Abramov, Brookline, MA (US); Yoav Ben Dror, Rehovot (IL); Amir Gaash, Rehovot (IL); David Leshem, Ramat HaSharon (IL); Yehuda Niv, Nes Ziona (IL); Benny Poupko, Nes Ziona (IL)

(73) Assignee: Indigo N.V., Maastricht (NL)

( * ) Notice: Subject to any disclaimer, the term of this patent is extended or adjusted under 35 U.S.C. 154(b) by 576 days.

(21) Appl. No.: 08/945,415

(22) PCT Filed: May 3, 1996

(86) PCT No.: PCT/NL96/00193

§ 371 (c)(1),
(2), (4) Date: Mar. 27, 1998

(87) PCT Pub. No.: WO96/35182

PCT Pub. Date: Nov. 7, 1996

(30) Foreign Application Priority Data

May 3, 1995 (IL) .................................................. 113614

(51) Int. Cl.[7] .............................................. G06F 15/00
(52) U.S. Cl. ...................................... 358/1.13; 358/1.1
(58) Field of Search ................................ 395/101, 109, 395/112, 114, 180, 500, 653; 358/401, 488, 451, 500, 501, 530; 345/433; 399/8, 9, 16, 19, 82, 145; 364/551.01; 400/76, 61, 62; 347/14, 19, 142

(56) References Cited

U.S. PATENT DOCUMENTS

| | | | |
|---|---|---|---|
| 4,099,254 A | * 7/1978 | Andrews et al. | ............... 355/24 |
| 5,047,955 A | 9/1991 | Shope et al. | |
| 5,619,623 A | * 4/1997 | Takayanagi et al. | ......... 395/114 |
| 5,625,766 A | * 4/1997 | Kauffman | .................... 345/435 |
| 5,684,934 A | * 11/1997 | Chen et al. | .................. 395/101 |
| 5,706,410 A | * 1/1998 | Bagley et al. | .............. 395/112 |
| 5,758,042 A | * 5/1998 | Deschuytere | ............... 395/114 |
| 5,774,638 A | * 6/1998 | Kageyama et al. | ......... 395/114 |

FOREIGN PATENT DOCUMENTS

| | | |
|---|---|---|
| WO | 8810477 | 12/1988 |
| WO | 9502224 | 1/1995 |
| WO | 9624910 | 8/1996 |

* cited by examiner

Primary Examiner—Gabriel Garcia
(74) Attorney, Agent, or Firm—Fenster & Company

(57) ABSTRACT

A method of printing a multi-page job including producing separate non-bit mapped files for each page of the multi-page job, producing a page file for each page of the multi-page job, storing the page files in a memory and printing the page files in sequence. The page file may include color separations for the various colors to be printed on the page or other convenient forms of storage devoted to a single page. The page file may be in a bit mapped format or may be in the form of a continuous tone image in a format which can be easily converted into a bit-map format by the printer during the printing process. Preferably, the continuous tone image can be converted into a bit map for printing on the fly.

12 Claims, 3 Drawing Sheets

METHOD FOR PRINTING MULTI-PAGE IMAGES

RELATED APPLICATIONS

This application is a U.S. national application of PCT/NL96/00193, filed on May 3, 1996.

FIELD OF THE INVENTION

The present invention is relates to printing of images in general and, more particularly, to methods for printing multi-page images.

BACKGROUND OF THE INVENTION

Electronically based printing can be divided into three parts. In the first part an image, which may consist of text only, images only, line drawings only or any combination of text images or line drawings is formed into an text or combination text and image file. In general, long files require more than one page for printing and the files represent more than one page of text and/or image.

When this information is to be directly printed from the application which generates the file, the application paginates the file and sends it to the printer in a form which the printer can use, for example in the form of a bit map or other such form.

In the preparation of films for offset printing a number of pages are generally printed at the same time on a large sheet in a mutual orientation suitable for subsequent folding and slitting in the manufacture of a multi-page document such as a book or magazine. Moreover, it is customary to treat each such multi-page sheet as a single file. When the film is to be generated, the multi-page file is transformed into a bit mapped image which is used to expose the film. Similarly, when printing is direct, i.e., without an intermediate film, the entire file is bit-mapped together for printing.

Thus, if one page of a multi-page file is to be changed, the entire file must be remapped, a rather time consuming process.

WO 95/02224 discloses a system for making up pages in which bit-mapped sub-page elements are stored in a memory and are organized into a page prior to printing.

SUMMARY OF THE INVENTION

The present invention seeks to provide a system in which the delays and down time associated by last minute changes are reduced or eliminated.

This is accomplished by generating a separate set of files, designated collectively herein as a "page file" for each page from image data provided by an application such as page make-up software or word processing and postscript type applications. The page file may include color separations for the various colors to be printed on the page or other convenient forms of storage devoted to a single page. The page file may be in a bit mapped format or may be in the form of a continuous tone image in a format which can be easily converted into a bit-map format by the printer during the printing process. Preferably, the continuous tone image can be converted into a bit map for printing on the fly.

There is thus provided, in accordance with a preferred embodiment of the invention, a method of printing a multi-page job comprising:

producing separate non-bit mapped files for each page of the multi-page job;

producing a page file for each page of the multi-page job;

storing the page files in a memory; and printing the page files in sequence.

In a preferred embodiment of the invention the method includes:

producing at least one replacement non-bit mapped file for one of the pages of the multi-page job to replace one of the pages for which a page file has been previously generated;

producing a replacement page file for the replacement page; and storing the replacement page file in the memory, wherein the replacement page file is printed in the sequence in place of the page being replaced.

There is further provided, in accordance with a preferred embodiment of the invention, a method of preparing a a multi-page job for printing comprising:

producing separate non-bit mapped files for each page of the multi-page job;

producing a page file for each page of the multi-page job;

storing the page files in a memory;

producing at least one replacement non-bit mapped file for one of the pages of the multi-page job to replace one of the pages for which a page file has been previously generated;

producing a replacement page file for the replacement page; and storing the replacement page file in the memory.

Preferably, the method further comprises:

printing the multi-page file with the replacement page replacing the page which has been replaced.

In one preferred embodiment of the invention, the page file comprises at least one bit mapped image of the page. In a second preferred embodiment of the invention, the page file comprises a continuous tone file adapted for on-the-fly conversion to a bit map during printing.

In a preferred embodiment of the invention the page file is stored in compressed form in the memory.

BRIEF DESCRIPTION OF THE DRAWINGS

The present invention will be understood and appreciated more fully from the following detailed description, taken in conjunction with the drawings in which.

DISCLOSURE OF THE PREFERRED EMBODIMENTS OF THE INVENTION

Figure 1:
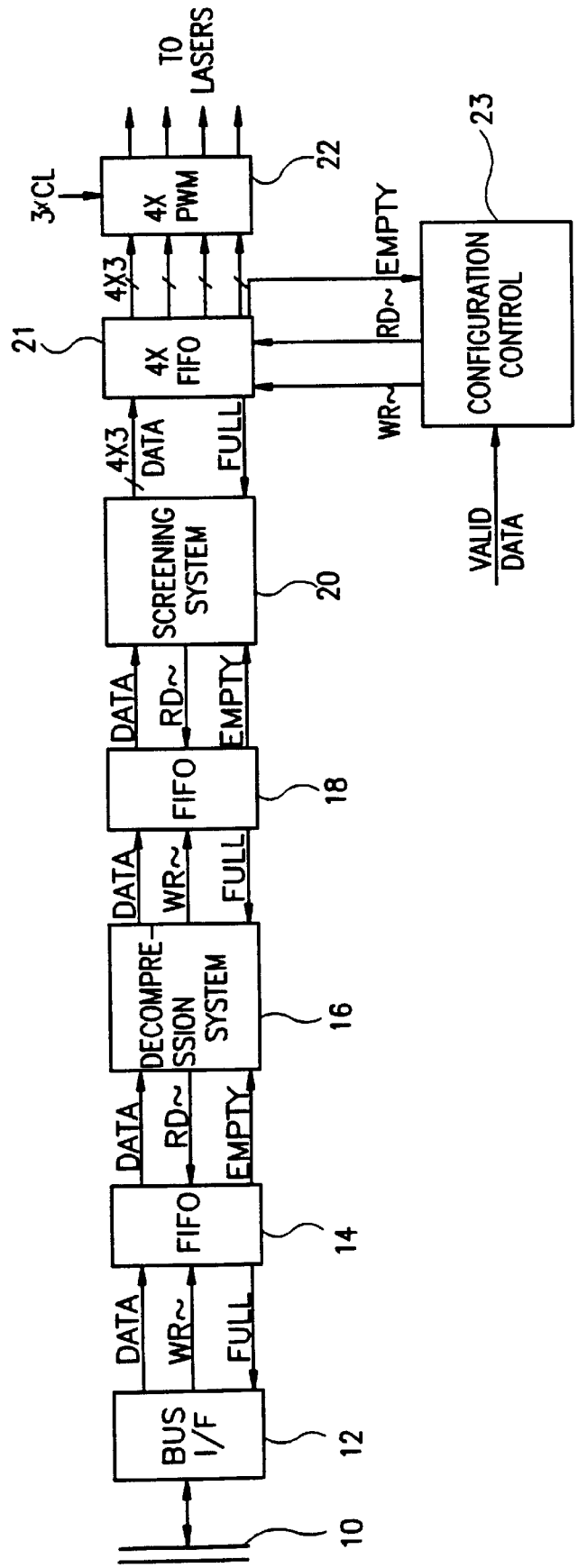
FIG. 1 is a block diagram of a system for converting a page file into printing commands for a laser writing head.

The prior art situation has been considered acceptable, especially for low resolution systems or for systems which operated off-line from the printing system, for example film preparation systems. In low resolution systems, the bit-mapping operation is not time consuming and is a relatively small overhead on the total printing operation. For such systems the computer software bit maps the image and transfers the bit mapped image a page at a time to the printer for printing. Since the resolution is generally low, the waiting time after the first printed page is generally negligible. For off-line systems the speed of the bit-mapping operation is not a factor in the print room since only the final films are used for printing.

In high speed direct printing machines, such as the E-Print 1000 (Indigo, N.V., The Netherlands) the printing speed is greater than the bit-mapping speed for normally coded images or for postscript images. Thus, in this equipment, bit-maps or intermediate files which store the bit mapped or continuous tone information (or a combination of the two) in a convenient real time convertible format, are generally prepared in advance and stored in a memory within the printing machine. The process of converting a standard format file into a bit mapped or other real time convertible format is referred to herein by the shorthand term "crunching." Print jobs are then queued, converted to bit-map if necessary, and printed in turn.

Thus, if a multi-page job must be changed after it is crunched, a delay in the printing process may result and, in extreme cases, in some downtime on the printer may result. Since this printer also includes the facility of previewing of the bit mapped images prior to printing, the chances of last minute changes are increased.

In order to solve this problem, the present invention provides a method by which each individual page of a print job is supplied to the printing machine in a separate file. The printer groups these files into a job which is the basic printing unit. When the image is crunched and stored a job file is created which contains the memory addresses of the individual page files. As an important part of this process, when a print job is prepared for printing, the software used (which may produce a postscript output file or a file having a different format) is commanded to produce each page in a separate file, generally by requesting each page separately.

Each file is then separately crunched and stored in the memory of the printer in under its job number and page number, each page being stored in an identifiable and replaceable page file.

When the job is to be printed, the job file instructs the system to print the pages sequentially in accordance with the original sequence of the pages. For larger pages in which several pages are printed on a sheet, in a sequence and orientation consistent with a later folding operation, the individual pages are positioned and orientated in a manner consistent with the final desired printed sheet.

If a page within the job must be changed after crunching, it is not necessary to crunch the entire job, only the new (replacement) page need be crunched. This new crunched page is stored in the printer memory and the job file is amended to indicate the new address of the stored page.

Figure 3:
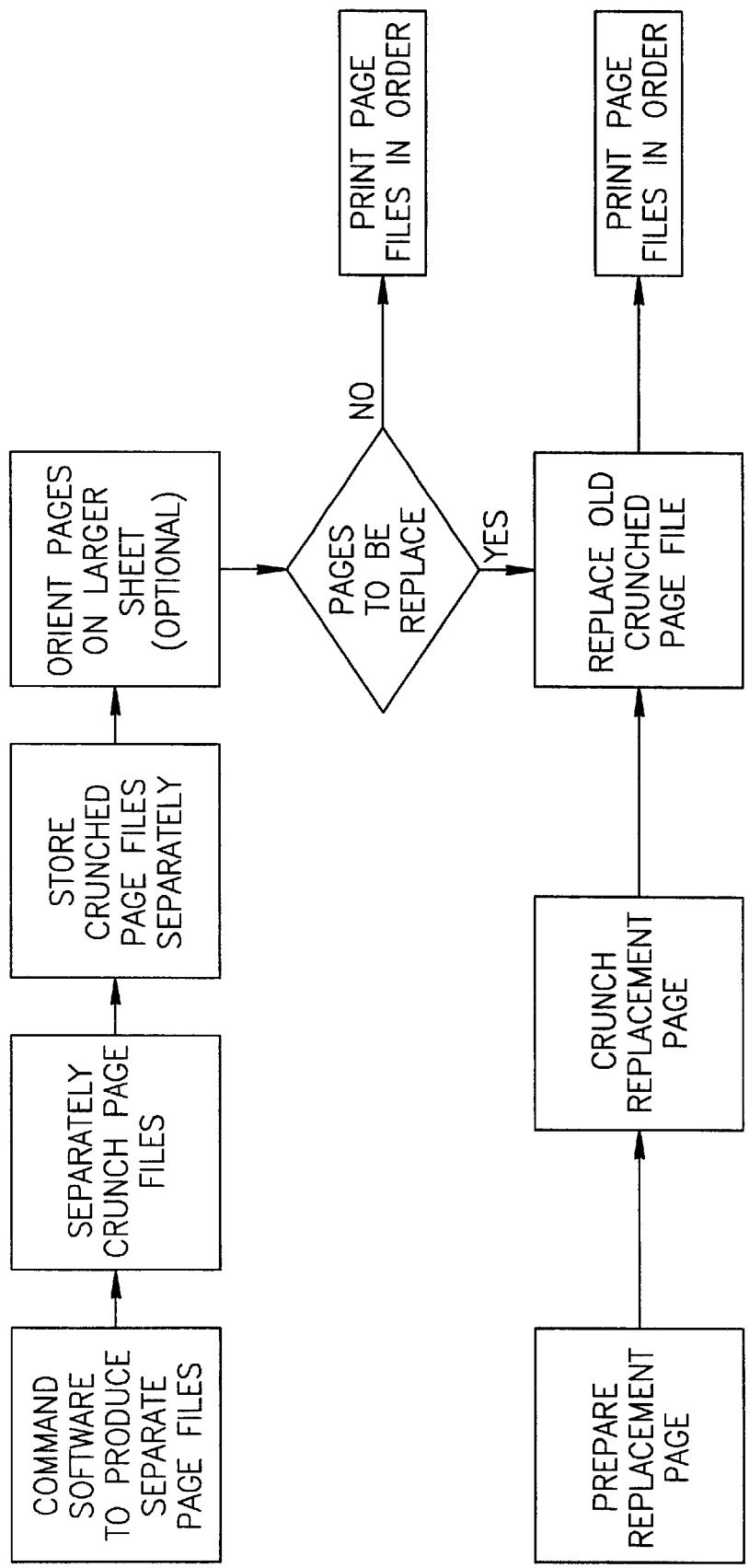
FIG. 3 is a flow diagram illustrating a preferred embodiment of the invention.

Preferably, the crunched images include compression to save storage space. Preferably, a run-length compression algorithm as described below is used for compression of the bit-mapped image prior to storage. A flow diagram illustrating the above method is shown in FIG. 3.

Additionally, in a preferred embodiment of the invention, the job file may be used to tie together units which are smaller than a full page. In this embodiment, the application software which prepares the text and/or images prepares a plurality of files, at least some of which are smaller than a full page. In total, the files cover all of the full pages. In practice, the job file keeps track of the positions of the files in the printing cycle and of their addresses in memory. When the job is printed, the files are either read sequentially of combined to form a single printing file.

Replacement of a portion of a page file (congruent with a page) is performed in the same way as a full page replacement.

As indicated above, the page file may be in compressed bit mapped form or in the form of a continuous tone image (optionally combined with bit mapped portions) in a format which can be easily converted into a bit-map format by the printer during the printing process. A preferred embodiment of such a format is based on cells containing a 4×4 matrix of pixels with a pixel resolution of 800 DPI.

These cells are of two kinds. One kind of cell is a simple bit-mapped, bi-level cell. For these cells, the information on which levels are high and which are off, is stored in a vector form. If a number of contiguous cells are bit mapped a first word indicates that this is the case, a second word indicates the number of cells which are bit mapped. The vectors for these cells are then listed without additional definition of the cells. Such a group of cells may be of any length; however, in a practical preferred embodiment of the invention, the length is limited to 256, the length which is definable by an 8 bit word.

For cells which are defined in terms of a continuous tone, there are two possibilities. One possibility is that all of the pixels have the same or similar pixel values. In this case the average value of the continuous tone, is provided for the cell at a resolution of preferably 128 gray levels. Where a number of contiguous cells have the same value, a special word is used to indicate this fact, a second word indicates the number of cells (up to 256) which have the same value and a third word gives the gray level value for the run of cells.

If the variation of the continuous tone values within the cell is greater than a given amount, i.e., there is an edge within the cell, then two types of information are stored. One type of information is the two gray levels which correspond relatively closely to the gray levels on the two sides of the edge. Since the eye does not discern the exact gray levels near an edge, the number of combinations is reduced from the theoretical number possible and only about 120 combinations are available. The second type of information which is stored is the position of the edge in the form of a vector which describes which pixels have which of the two values. This vector has the same form as the defining vector for the bi-level, bit-mapped image. Israel patent application 112, 561 which was filed on Feb. 6, 1995 and corresponding PCT application titled "High Resolution Imaging" filed as PCT\NL95\00200 on Jun. 6, 1996, the disclosures of which are incorporated herein by reference, give additional information on such a system.

The choice of a 4×4 cell is based on practical considerations such as the spatial and gray level resolution which is discernible by a viewer and compression efficiency.

In practice, an 8 bit word is the basic coding unit. 256 codes are available from an 8 bit word; 128 codes are used to define the 128 continuous tone gray levels which are printed for single level cells and 120 codes are used to define the reduced set of combinations of gray levels for a continuous tone edge cell. One code is used to indicate that the next cell is to be bit mapped, one code is used to indicate that the multiple cells are bit mapped and one code is used to indicate a situation in which a plurality of contiguous cells have the same value. A special code is used to indicate a run length followed by a bit mapped cell. Such situations are found in text printing.

This type of code can be decoded by a decoder to bit map system such as that shown, in block diagram form if FIG. 1. In FIG. 1 a word is asynchronously fed from a bus 10 via a bus interface 12 and a FIFO 14 to a decompression system 16 which converts the compressed data in the above format to decompressed data, namely, continuous tone data based on descriptors for single cells, be they continuous tone cells, bi-level cells or bit-mapped cells. Decompression of compressed data is well known in the art. This cell descriptor information is sent asynchronously, via a second FIFO 18 to a screening system 20 which converts the cell descriptor information into bit map information in a manner which is suitable for activation of a laser printer, for example one having four parallel independently addressable lasers.

The output of the screening system is sent, asynchronously via four FIFOs 21 to a pulse width modulation system 22 for activation of the lasers.

The flow of data to the lasers is controlled by a configuration control module 23 which receives information on the position of the image on the printed page and whether the system is ready to print the next group of pixels and on this basis controls transfer of the data from the screening system to lasers. It should be understood that data is transmitted asynchronously between modules up until FIFO 21. At this point the data is transmitted in accordance with the position of the lasers vis-a-vis the imaging surface of the printer.

Figure 2:
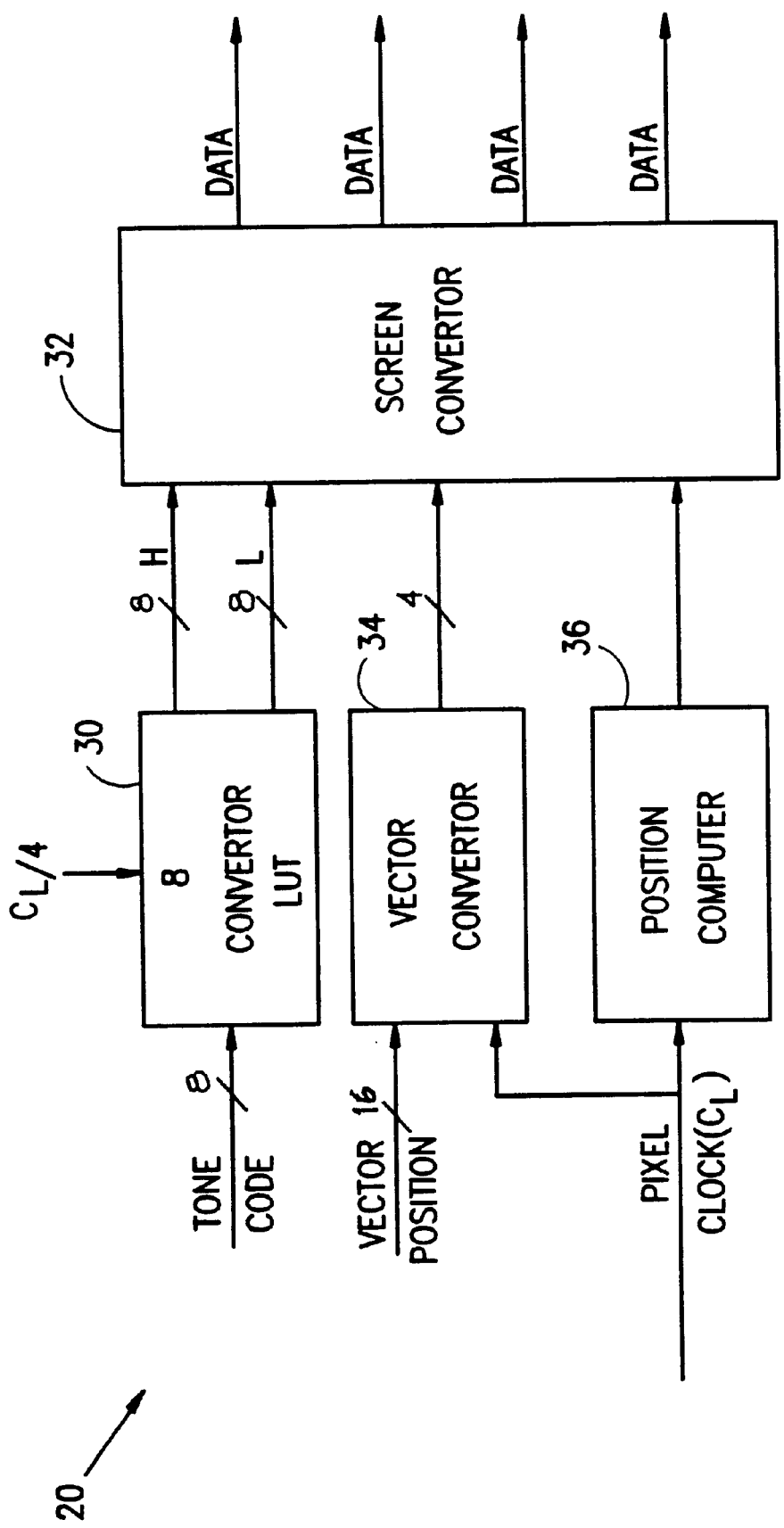
FIG. 2 is a more detailed block diagram of a screening system of FIG. 1.

A preferred embodiment of screening system 24 is shown in FIG. 2. An 8 bit code for which describes the continuous tone level (or the reduced set of two continuous tone levels for an edge cell) is received by a convertor/look up table 30 which produces two 8 bit signals giving the high and low values of continuous tone for the edge case or an 8 or greater bit signal for a single continuous tone cell. These signals are sent to a screen convertor 32 for conversion to a stream of bit mapped data.

A 16 bit vector descriptor which describes the edges of either the continuous tone (two level) cell or the matrix of a bi-level cell is received by a vector convertor 34 which sends a 4 bit command signal to the screen convertor. This four bit signal is sent at the rate at which a column of pixels in a cell are printed, i.e., at four times the cell rate. This vector is active only if the cell is a bi-level cell (in which case the convertor ignores any information it receives from look-up table 30 or vector convertor 34 and prints an on or off pixel based on the 4 bit signal) or a two level continuous tone cell (in which case the 4 bit signal informs the screen convertor whether the level is the high or low continuous tone level).

In a preferred embodiment of the invention, rational screening angles are used. Screen convertor 32 includes a look up table (on-off bit maps) for each gray level and combination on a matrix size equal to the smallest repeat of the rational angle matrix. A position computer 36, informs the screen convertor of the position within the repeat occupied by the next column of four pixels. It calculates this position based on a knowledge of the repeat matrix size and the image width, both of which are fixed for a given page. The screen convertor then need only look-up the bit value on the matrix corresponding to the gray level and pass this on to the laser printer.

The output of the screening convertor is a 3 bit signal which represents the gray level to be printed for a given pixel (at 800 DPI). These signals are converted to pulse width modulation signals by pulse width modulators 22 which modulate the laser at a higher rate than the pixel rate, depending on the speed with which the laser can be switched.

It will be appreciated by persons skilled in the art that the present invention is not limited by the description and example provided hereinabove. Rather, the scope of this invention is defined only by the claims which follow:

What is claimed is:

1. A method of printing a multi-page job comprising:

producing separate non-bit mapped files for each page of the multi-page job;

producing a page file for each page of the multi-page job;

storing the page files in a memory; and printing the page files in sequence.

2. A method of printing according to claim 1 and comprising:

producing at least one replacement non-bit mapped file for one of the pages of the multi-page job to replace one of the pages for which a page file has been previously generated;

producing a replacement page file for the replacement page; and storing the replacement page file in the memory, wherein the replacement page file is printed in the sequence in place of the page being replaced.

3. A method according to claim 2 wherein the replacement page file comprises a continuous tone file adapted for on the fly conversion to a bit map during printing.

4. A method according to claim 1 wherein the page file comprises at least one bit mapped image of the page.

5. A method according to claim 4 wherein the bit mapped images are stored in compressed form.

6. A method according to claim 4 wherein the replacement page file comprises a continuous tone file adapted for on the fly conversion to a bit map during printing.

7. A method according to claim 5 wherein the replacement page file comprises a continuous tone file adapted for on the fly conversion to a bit map during printing.

8. A method according to claim 1 wherein the page file comprises a continuous tone file adapted for on-the-fly conversion to a bit map during printing.

9. A method of preparing a multi-page job for printing comprising:

producing separate non-bit mapped files for each page of the multi-page job;

producing a page file for each page of the multi-page job;

storing the page files in a memory;

producing at least one replacement non-bit mapped file for one of the pages of the multi-page job to replace one of the pages for which a page file has been previously generated;

producing a replacement page file for the replacement page; and storing the replacement page file in the memory.

10. A method according to claim 9 further comprising:

printing the multi-page file with the replacement page file replacing the page which has been replaced.

11. A method according to claim 9 wherein the replacement page file comprises a continuous tone file adapted for on the fly conversion to a bit map during printing.

12. A method according to claim 10 wherein the replacement page file comprises a continuous tone file adapted for on the fly conversion to a bit map during printing.

* * * * *